US009557400B2

(12) United States Patent
Wu

(10) Patent No.: US 9,557,400 B2
(45) Date of Patent: Jan. 31, 2017

(54) 3D SOUNDSCAPING

(75) Inventor: Sean F. Wu, Troy, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 514 days.

(21) Appl. No.: 13/265,983

(22) PCT Filed: Apr. 26, 2010

(86) PCT No.: PCT/US2010/032346
§ 371 (c)(1),
(2), (4) Date: Dec. 16, 2011

(87) PCT Pub. No.: WO2010/124274
PCT Pub. Date: Oct. 28, 2010

(65) Prior Publication Data
US 2012/0093339 A1    Apr. 19, 2012

Related U.S. Application Data

(60) Provisional application No. 61/172,494, filed on Apr. 24, 2009.

(51) Int. Cl.
*H04R 3/00* (2006.01)
*G01S 3/808* (2006.01)

(52) U.S. Cl.
CPC ................... *G01S 3/8083* (2013.01)

(58) Field of Classification Search
CPC ........ G03H 3/00; H04S 1/002; H04S 2420/01; H04S 7/14; G01S 3/8083
USPC .................. 381/92, 17, 26, 94.1, 122; 367/8
See application file for complete search history.

(56) References Cited

U.S. PATENT DOCUMENTS

2002/0181721 A1* 12/2002 Sugiyama ................ G01H 3/00
381/92
2008/0247566 A1* 10/2008 Mao .......................... G01S 5/22
381/92

OTHER PUBLICATIONS

Notification Concerning Transmittal of International Preliminary Report on Patentability for PCT/US2010/032346 mailed on Nov. 3, 2011.

* cited by examiner

Primary Examiner — Vivian Chin
Assistant Examiner — Ammar Hamid
(74) Attorney, Agent, or Firm — Carlson, Gaskey & Olds, P.C.

(57) ABSTRACT

A system and method for tracking and tracing motions of multiple incoherent sound sources and for visualizing the resultant overall sound pressure distribution in 3D space in real time are developed. This new system needs only four microphones (although more could be used) that can be mounted at any position so long as they are not placed on the same plane. A sample configuration is to mount three microphones on the y, z plane, while the 4th microphone on a plane perpendicular to the y, z plane. A processor receives signals from the microphones based on the signals received from noise sources in unknown locations, and the processor determines the locations of these sources and visualizes the resultant sound field in 3D space in real time. This system works for broadband, narrowband, tonal sound signals under transient and stationary conditions.

26 Claims, 2 Drawing Sheets

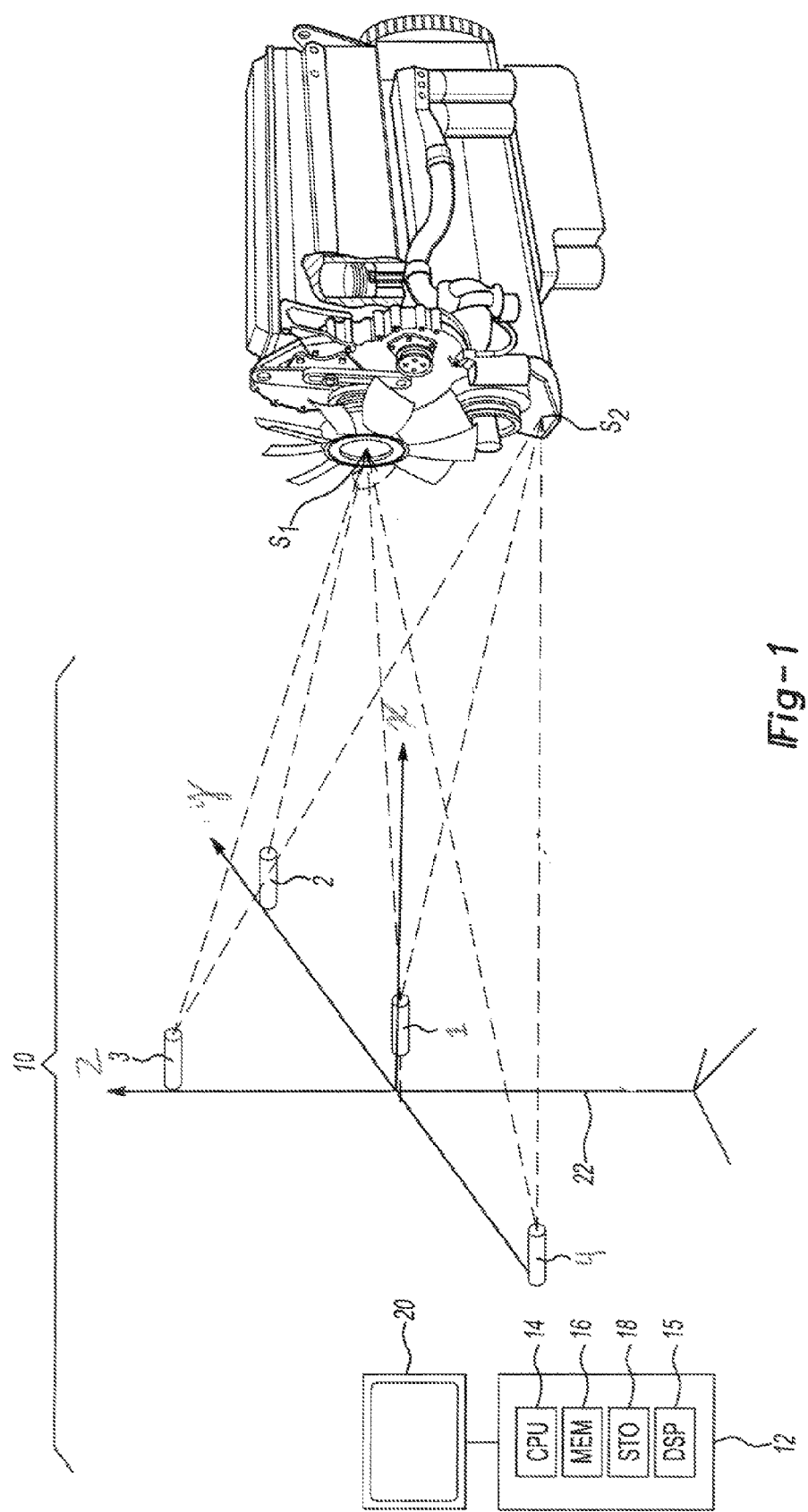

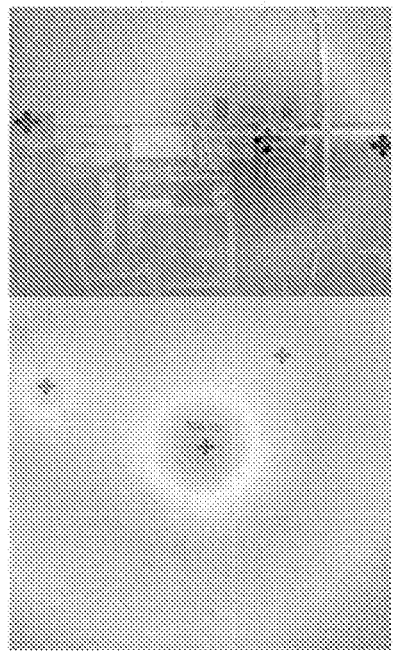
Figure 2. Illustration of 3D soundscaping. Three incoherent sound sources including tonal and broadband sounds are correctly identified and the resultant 3D sound field is plotted. The top graph is a front view ($y$, $z$ plane), and bottom graph is top view ($x$, $z$ plane).

3D SOUNDSCAPING

RELATED APPLICATIONS

This application is a national phase of PCT/US2010/032346, filed Apr. 26, 2010, which claims the benefit of U.S. Provisional Application No. 61/172,494, filed Apr. 24, 2009.

BACKGROUND

The present invention describes a system and method for locating and tracing multiple sound sources that can be stationary or moving in space and visualizing the resultant sound pressure fields in 3D space in real time.

Presently, there are no known systems and tools that enable one to visualize the sound pressure field produced by arbitrary (stationary/moving) sound sources in 3D space in real time. There are systems and tools available, however, to identify a sound source using the beamforming technology, and systems and tools to visualize a 3D sound field via nearfield acoustical holography (NAH) technology separately.

Typically, systems and tools based on beamforming technology require the use of a camera and an array of 30-60 microphones to measure the sound pressure, and then overlay the high sound pressure spots on the image of a test object captured by the camera to indicate the locations from which sounds are emitted.

The underlying principle behind beamforming is a delay and sum technique. By changing the time delays, namely, the phases of sound signals in the individual microphone channels and bringing all of them to be in phase so as to constructively reinforce each other, one can form a peak sound pressure, i.e., a beam that points in the direction of sound wave propagation in the space. This delay and sum process is equivalent to rotating the microphone array until it is in line with the incident sound wave. By using a camera and taking a picture of a test object that creates sound, one can overlay the high sound pressure on the image of the test object to indicate where sound is emitted. Note that since beamforming relies on a plane wave assumption, it can only reveal the direction of wave propagation but not the depth information, i.e., the distance of a sound source. The use of a camera compensates this shortcoming as a camera image is 2D, so the depth information is automatically suppressed.

In reality most source sources are 3D with complex geometry. Therefore, the acoustic information offered by beamforming is usually quite limited. Moreover, the sound pressure graph provided by beamforming is on a 2D measurement surface, but not on a 3D source surface. In particular, beamforming is effective for impulsive and broadband sound signals that contain high frequency components. In fact, the higher the frequency content and the broader the frequency bands are, the higher the spatial resolution of beamforming is. This is because the spatial resolution of beamforming is no better than one wavelength of a sound wave of interest, so it cannot discern two sources separated by a distance less than one wavelength. Hence beamforming is not suitable for low frequency cases. Also, the delay and sum technique is not applicable for locating sinusoidal, narrowband or tonal sound source. Finally, beamforming can not be used to monitor multiple sound sources in motion simultaneously.

NAH enables one to obtain 3D images of a sound field and very detailed and accurate information of the acoustic characteristics of a complex structure, including the source locations. However, NAH requires taking measurements of the acoustic pressures via an array of microphones positioned at a very close distance around the entire source. In particular, if a 3D image of a sound field is desired, measurements should include not only the source surface, but also the reflecting surfaces including floor, surrounding walls and ceiling, which is unfeasible in engineering applications. Finally, the state-of-the-art NAH does not allow for visualization of a 3D image of a sound field in real time. All visualization must be done in post processing.

SUMMARY

Described herein is a new way of tracking and tracing multiple noise sources that can be stationary or moving in space, and displaying the resultant sound field in 3D space in real time using four microphones only. This new technology includes two facets, the first being locating and monitoring multiple noise sources that can be either stationary or moving in space; the second being visualizing the resultant sound acoustic field produced by these sources in 3D space in real time.

In contrast to beamforming, this system does not need a priori knowledge of the location of a test object and uses four microphones only, so it is very simple to set up and easy to use, and hardware costs are significantly reduced. The underlying principle of this invention is a hybrid acoustic modeling and triangulation techniques to track and trace the positions of multiple noise sources in 3D space simultaneously in real time. In particular, this invention is applicable for broadband and narrowband sound sources over the entire audible frequency range from 20~20,000 Hz. Another salient feature of this new technology is its capability to locate multiple objects that emit tonal sounds at low frequencies.

The disclosed system enables one to monitor multiple sources anywhere including behind microphones, unlike beamforming that requires that the microphone array be aimed at a test object and the distance of the test object be specified. However, both beamforming and this method require that the line of sight of each microphone to a test object be clear at all time.

Table 1 shows the comparison of features and functions of this method and beamforming. Clearly, the former can provide much more than the latter does, yet it uses much fewer microphones, runs much faster and costs much less than the former does.

TABLE 1

Comparison of features and functions of the present invention and state-of-the-art beamforming technology

| Features and Functions | New Invention | Beamforming |
|---|---|---|
| Microphones configuration | Three dimensional | Two dimensional plane |
| Number of microphones | 4 | 30-60 |
| Underlying principle | A hybrid approach | Delay-and-sum technique |
| Suitable for stationary case? | Yes | Yes |
| Suitable for transient case? | Yes | Yes |
| Suitable for broadband sound? | Yes | Yes |
| Suitable for narrowband sound? | Yes | No |
| Suitable for tonal sound? | Yes | No |

TABLE 1-continued

Comparison of features and functions of the present
invention and state-of-the-art beamforming technology

| Features and Functions | New Invention | Beamforming |
|---|---|---|
| Suitable for low frequency? | Yes | No |
| Suitable for multiple sources? | Yes | No |
| Frequency range | 20 Hz~20,000 Hz | 800 Hz~20,000 Hz |
| Measurement distance | No restrictions | 0.4 m~2 m |
| Measurement orientation | No restrictions | Facing the test object |
| Display of results | In 3D space | On measurement surface only |
| Display of source locations | (x, y, z) coordinates | Color map |
| Spatial resolution | Very high | One wavelength of sound wave |
| Discernable source level | Up to 20 dB | <5 dB |
| Required signal to noise ratio | >−3 dB | >0 dB |
| Data acquisition and processing | Fully automated | Semi-automated |
| Post processing speed | Real time | Fast |
| Portable? | Yes | Yes |
| Easy to use? | Yes | Yes |
| Expensive? | No, not at all | Yes |

After locating sound sources, the sound pressures generated by these sources are calculated and the resultant sound pressure field in 3D space including the source surfaces is visualized. This 3D soundscaping produces direct and easy to understand pictures of sound pressure distribution in 3D space and how they change with time.

In contrast to NAH, this new method uses the propagating component of the sound pressure in the visualization process. This approximation is acceptable for the sound pressure in far field that is dominated by the propagating component. The near-field effects decay exponentially as the sound wave travels to the far field. This approximation greatly reduces complexities of numerical computation, increases the post processing and makes real-time 3D soundscaping possible. Since measurements are taken at a remote location, not at very close range to a target source as it does in NAH, the setup and operation of this new technology become very easy, simple and convenient.

The present invention requires four microphones that can be mounted at any position so long as they are not on the same plane. For example, one can place three microphones on one plane and the fourth microphone in another plane perpendicular to the first plane. A processor receives signals from these four microphones based on sound pressure signals received from a single or multiple sound sources in unknown locations, and the processor determines the locations of the sound sources based on the signals from the microphones.

The features of this new invention can be best understood from the following specifications and drawings.

BRIEF DESCRIPTION OF THE DRAWINGS

FIG. 1 illustrates a system for carrying out a 3D soundscaping according to one embodiment of the present invention, positioned in front of noise sources.

FIG. 2 illustrates sound pressure fields as determined by the system of FIG. 1.

DETAILED DESCRIPTION OF THE PREFERRED EMBODIMENT

A system 10 for carrying out a 3D soundscaping is shown in FIG. 1. The system includes a computer 12, including a processor 14, digital signal processor (DSP) 15, memory 16 and mass storage 18. Computer software for performing the functions described herein and any implied or necessary attendant functions are in memory 16 (such as RAM, ROM, hard drive, or any magnetic, optical or electronic storage or other computer readable medium) and executed by processor 14. Results may be displayed on a display 20, output to another system or process, or printed by a printer.

The computer 12 receives noise signals from microphones 1-4 arranged on a stand 22 (connections are not shown for clarity). Microphones 2-4 are arranged in a common y, z plane. Microphone 1 is positioned along the x-axis in front of the y, z plane. The sound sources, S1, S2, in this example an engine, may be positioned anywhere even inside the y, z plane. Note that the description of the method below is for determining the location of a sound source S, which can be performed separately for each of the noise sources S1, S2, . . . , SN, and for visualizing the resultant sound field produced by all these sources.

Consider the case in which the microphones 1-4 are mounted at $(x_1, y_1, z_1)$, $(x_2, y_2, z_2)$, $(x_3, y_3, z_3)$, and $(x_4, y_4, z_4)$, respectively, and the unknown sound source is at $(x, y, z)$. Accordingly, the relative distances between the unknown source and the individual microphones can be expressed as $$\sqrt{(x-x_2)^2 + (y-y_2)^2 + (z-z_2)^2} = \sqrt{(x-x_1)^2 + (y-y_1)^2 + (z-z_1)^2} + (c\Delta t_{12}), \quad (1)$$

$$\sqrt{(x-x_3)^2 + (y-y_3)^2 + (z-z_3)^2} = \sqrt{(x-x_1)^2 + (y-y_1)^2 + (z-z_1)^2} + (c\Delta t_{13}), \quad (2)$$

$$\sqrt{(x-x_4)^2 + (y-y_4)^2 + (z-z_4)^2} = \sqrt{(x-x_1)^2 + (y-y_1)^2 + (z-z_1)^2} + (c\Delta t_{14}), \quad (3)$$

where c is the speed of sound in the air, $\Delta t_{12}$, $\Delta t_{13}$, and $\Delta t_{14}$ represent the time delays between the $1^{st}$ and 2nd, $1^{st}$ and $3^{rd}$, and $1^{st}$ and $4^{th}$ microphones, respectively. These time delays can be obtained by taking cross correlations between the $1^{st}$ and $2^{nd}$, $1^{st}$ and $3^{rd}$, and $1^{st}$ and $4^{th}$ microphones, respectively, when the incident wave contains broadband frequencies. When the incident sound wave is narrowband or contains a single frequency, a different methodology should be used to determine the relative time delays.

Once these time delays are obtained, the location of an unknown source can be determined by solving Eqs. (1) to (3) simultaneously. The general solution is very involved and long. As an example, we present a simplified version of the solution of Eqs. (1) to (3) with microphones 1-4 mounted on three mutually orthogonal axes at equal distance with respect to the origin of the coordinate system, namely, $(d_0, 0, 0)$, $(0, d_0, 0)$, $(0, 0, d_0)$, and $(0, 0, -d_0)$. Under this condition, Eqs. (1) to (3) reduce to $$2d_0(x-y) - (c\Delta t_{12})^2 = 2c\Delta t_{12}\sqrt{(x-d_0)^2 + y^2 + z^2}, \quad (4)$$

$$2d_0(x+y) - (c\Delta t_{13})^2 = 2c\Delta t_{13}\sqrt{(x-d_0)^2 + y^2 + z^2}, \quad (5)$$

$$2d_0(x-y) - (c\Delta t_{14})^2 = 2c\Delta t_{14}\sqrt{(x-d_0)^2 + y^2 + z^2}, \quad (6)$$

where $d_0$ is a given distance with respect to the origin of the coordinate system.

Equations (4) and (5) can be combined so as to write y in terms of x as $$y = a_1 x + b_1, \quad (7)$$

where $$a_1 = \frac{\Delta t_{13} - \Delta t_{12}}{\Delta t_{13} + \Delta t_{12}}, \quad (8a)$$

$$b_1 = \frac{c^2 \Delta t_{12} \Delta t_{13} (\Delta t_{13} - \Delta t_{12})}{2 d_0 (\Delta t_{13} + \Delta t_{12})}. \quad (8b)$$

Similarly, Eqs. (4) and (6) can be combined to express z in terms of x as $$z = a_2 x + b_2, \quad (9)$$

where $$a_2 = \left(\frac{\Delta t_{12} - \Delta t_{14}}{\Delta t_{12}}\right) + \left(\frac{\Delta t_{14}}{\Delta t_{12}}\right)\left(\frac{\Delta t_{13} - \Delta t_{14}}{\Delta t_{13} + \Delta t_{12}}\right), \quad (10a)$$

$$b_2 = \left(\frac{c^2 \Delta t_{13} \Delta t_{14}}{2 d_0}\right)\left(\frac{\Delta t_{13} - \Delta t_{12}}{\Delta t_{13} + \Delta t_{12}}\right). \quad (10b)$$

Substituting Eqs. (7) and (9) into (6) yields a binomial equation for x $$A_1 x + B_1 = \sqrt{A_2 x^2 - B_2 x + C_2}, \quad (11)$$

where $$A_1 = \frac{2 d_0 (1 - a_2)}{2 c \Delta t_{14}}, \quad (12a)$$

$$B_1 = -\frac{2 d_0 b_2 + (c \Delta t_{14})^2}{2 c \Delta t_{14}}, \quad (12b)$$

$$A_2 = 1 + a_1^2 + a_2^2, \quad (12c)$$

$$B_2 = 2(d_0 - a_1 b_1 - a_2 b_2), \quad (12d)$$

$$C_2 = d_0^2 + b_1^2 + b_2^2, \quad (12e)$$

Solution for x is then given by $$x_{1,2} = \frac{-(2 A_1 B_1 + B_2) \pm \sqrt{(2 A_1 B_1 + B_2)^2 - 4(A_1^2 - A_2)(B_1^2 - C_2)}}{2(A_1^2 - A_2)}. \quad (13)$$

The solution is calculated by the processor 14 or DSP 15. Once x is solved, the other coordinates y and z are given by Eqs. (7) and (9). Note that there are always two real roots in Eq. (13), which will lead to two different source locations. Apparently, this cannot happen. Therefore one of the roots must be wrong, but the correct root can be picked automatically.

The correct root is selected in this approach. Assume that Eq. (13) yields two roots that lead to two locations at $\vec{r}_{S1} = x_{S1} \vec{e}_x + y_{S1} \vec{e}_y + z_{S1} \vec{e}_z$ and $\vec{r}_{S1} = x_{S1} \vec{e}_x + y_{S1} \vec{e}_y + z_{S1} \vec{e}_z$. Listed below are steps for picking the correct location.

1. Calculate the distances between $\vec{e}_{S1}$ and $\vec{r}_{S2}$ with respect to each microphone, respectively, namely, $R_{S1,i} = |\vec{r}_{S1} - \vec{r}_i|$ and $R_{S2,i} = |\vec{r}_{S2} - \vec{r}_i|$, where i=1 to 4.
2. Find the minimum and maximum distances with respect to all microphones: $\min(R_{S1,i})$, $\max(R_{S1,i})$, $\min(R_{S2,i})$, and $\max(R_{S2,i})$, where i=1 to 4.
3. Identify the microphones with $\min(R_{S1,i})$ and $\max(R_{S1,i})$, and $\min(R_{S2,i})$ and $\max(R_{S2,i})$, respectively.
4. If $\vec{r}_{S1}$ and $\vec{r}_{S2}$ are on opposite sides of the coordinate system, perform Steps 5 and 6.
5. Calculate time delays in these microphones with respect to source locations $\vec{r}_{S1}$ and $\vec{r}_{S2}$, and compare them with those of cross correlations.
6. The correct source location will have the time delay that closely matches the measured one obtained by cross correlations.
7. If $\vec{r}_{S1}$ and $\vec{r}_{S2}$ are on the same side of the coordinate system, perform Steps 8 through 11.
8. Assume that the source is located at $\vec{r}_{S1}$ with amplitude A. The amplitudes of the acoustic pressures at the microphone that corresponds to $\min(R_{S1,i})$ and $\max(R_{S1,i})$ can be written, respectively, as $$p_{max}^{(1)}[\min(R_{S1,i})] = \frac{A}{\min(R_{S1,i})} \text{ and } p_{min}^{(1)}[\max(R_{S1,i})] = \frac{A}{\max(R_{S1,i})}.$$

Similarly, for the source located at $\vec{r}_{S2}$ with an amplitude A, the amplitudes of the acoustic pressures at the microphones that correspond to $\min(R_{S2,i})$ and $\max(R_{S2,i})$ can be expressed, respectively, as $$p_{max}^{(2)}[\min(R_{S2,i})] = \frac{A}{\min(R_{S2,i})} \text{ and } p_{min}^{(2)}[\max(R_{S2,i})] = \frac{A}{\max(R_{S2,i})}.$$

9. Calculate the rates of decay of the acoustic pressures emitted from sources at $\vec{r}_{S1}$ and $$\vec{r}_{S2}: \frac{\Delta p^{(1)}}{\Delta r} = \frac{p_{max}^{(1)}[\min(R_{S1,i})] - p_{min}^{(1)}[\max(R_{S1,i})]}{\max(R_{S1,i}) - \min(R_{S1,i})}$$

$$= \frac{A}{\max(R_{S1,i}) \min(R_{S1,i})} \text{ and}$$

$$\frac{\Delta p^{(2)}}{\Delta r} = \frac{p_{max}^{(2)}[\min(R_{S2,i})] - p_{min}^{(2)}[\max(R_{S2,i})]}{\max(R_{S2,i}) - \min(R_{S2,i})}$$

$$= \frac{A}{\max(R_{S2,i}) \min(R_{S2,i})}.$$

10. In practice, the amplitude A is unknown a priori. However, test results have shown that the value of A can be approximated by taking a spatial average of the measured acoustic pressures $$A = \frac{1}{4} \sum_{i=1}^{4} p_{rms,i}^2,$$

where $p_{rms,i}^2$, i=1 to 4, are the root-mean-squared values of the acoustic pressures in each microphone.
11. The rms values of the acoustic pressure in the microphones corresponding to the minimum and maximum distances are known. Therefore, by comparing the rate of decay of the measured acoustic pressure at these two microphones with that of the calculated ones, we can identify the correct source location.

The above procedure would be performed by the processor 14 or DSP 15. It is emphasized that the above procedures can be used to identify the source location (x, y, z) when microphones are placed at any position so long as they are not all on the same plane. This provides great flexibility in the set up of its microphone array.

The present method can also track and trace a sound source that produces a single frequency (tonal sound), another feature that cannot be matched by any other technology such as beamforming.

The main difficulty in locating a source producing sinusoidal (tonal) sound is due to the fact that the signal is cyclic and continuous. Thus, there is no beginning or end in the time history of the incident sound wave. This makes it impossible to apply cross correlations to determine the time delays among individual microphones.

To circumvent this difficulty, the following procedures calculate the time delays among individual microphones.
1. Place two indices separated by a small time interval, say, $10\Delta t_{unit}$, where $\Delta t_{unit}$ is the unit time step equal to the inverse of the sampling rate, on the time-domain signal in, say, microphone channel no. 1.
2. Search and put the $1^{st}$ index at the peak amplitude of the incident tonal sound wave in the microphone channel 1 and $2^{nd}$ index a small time interval next to the $1^{st}$ index on the time-domain signal.
3. Synchronize the indices in microphone channel 1 with those in microphones 2, 3, and 4, so they are all aligned at exactly the same time instances.
4. In order for this method to work, we require that the time delay $\Delta t_{1i}$ between the $1^{st}$ and $2^{nd}$, $1^{st}$ and $3^{rd}$, and $1^{st}$ and $4^{th}$ channels satisfy the inequalities $$\Delta t_{1i} < \frac{\lambda}{2c}, \quad (14a)$$

$$\Delta t_{1i} < \frac{\sqrt{(x_1 - x_i)^2 + (y_1 - y_i)^2 + (z_1 - z_i)^2}}{c}, \quad (14b)$$

$$\lambda < 2\sqrt{(x_1 - x_i)^2 + (y_1 - y_i)^2 + (z_1 - z_i)^2}, \quad (14c)$$

where i=2, 3, and 4, $\lambda$ is the wavelength of the incident wave, and c is speed of sound in the air.
5. Check the slopes of the indices in all microphone channels. The slope in the $1^{st}$ microphone channel is always negative because the $1^{st}$ index is always at the peak amplitude of an incident sound wave and the $2^{nd}$ index is some time later. The slopes in other channels, however, may be positive or negative. If the slope in the $i^{th}$ channel is negative, then the incident sound wave reaches the $1^{st}$ microphone first, so the time delay between the $1^{st}$ microphone and $i^{th}$ microphone $\Delta t_{1i}$ is positive. If the slope in the $i^{th}$ channel is positive, then the incident sound wave reaches the $i^{th}$ microphone first, thus the time delay $\Delta t_{1i}$ between the $1^{st}$ microphone and the $i^{th}$ microphone is negative.
6. If the time delay $\Delta t_{1i}$ is positive, move indices in the $i^{th}$ microphone channel in the increasing time direction until the $1^{st}$ index reaches the peak amplitude of the time-domain signal. The difference between the $1^{st}$ indices in the $1^{st}$ and $i^{th}$ microphone channels is the time delay $\Delta t_{1i}$.
7. If the time delay $\Delta t_{1i}$ is negative, move indices in the $i^{th}$ microphone channel in the decreasing time direction until the $1^{st}$ index reaches the peak amplitude of the time-domain signal. The difference between the $1^{st}$ indices in the $1^{st}$ and $i^{th}$ microphone channels is the time delay $\Delta t_{1i}$.

These calculations are performed by the processor 14 or the DSP 15. Apparently, this approach has a limit on the highest frequency it can handle, which is determined by the microphone spacing. The larger the microphone spacing is, the lower the frequency of the incident tonal sound this device can handle. Hence, to increase the upper frequency limit the microphone spacing must be reduced. Note that this invention has no restriction whatsoever on the placement of the microphone and therefore, users can adjust the microphone spacing, if necessary, in tracking and tracing a tonal sound source.

Once the locations of sound sources are identified, the resultant sound field in 3D space can be visualized by superimposing contributions from all the individual sources. To simplify the numerical computations and speed up post processing, we choose to consider the propagating component of the sound pressure in this process only. This approximation is acceptable, especially when our goal is to visualize the sound pressure field throughout the entire space.

Assume that the strength of the $m^{th}$ source in a particular frequency band is $$S_m = A_{mn} r_{Sn}, \quad (15)$$

where $S_m$ represents the strength of the $m^{th}$ source, $A_{mn}$ implies the spatial average of the rms value of the acoustic pressures measured at all four microphones for the $n^{th}$ frequency band and $r_{Sn}$ stands for the radial distance of the dominant sound source in the $n^{th}$ frequency band.

$$A_{mn} = \frac{1}{4} \sum_{i=1}^{4} p_{rms,i}^{(n)}. \quad (16)$$

where $p_{rms,i}^{(n)}$ represents the rms values of the acoustic pressures measured in all four microphones.

The rms value of the acoustic pressure resulting from this dominant source at any location in the $n^{th}$ frequency band can then be approximated by $$p_{rms}^{(n)}(x, y, z) = \frac{1}{4} \sum_{i=1}^{4} p_{rms,i}^{(n)} \frac{r_{Sn}}{r_n(x, y, z)}. \quad (17)$$

where $r_n(x,y,z)$ represents the radial distance from the $n^{th}$ frequency band source to anywhere in 3D space. Note that we choose to consider the dominant source within each frequency only in order to simplify the computations. As a result, the resultant sound pressure field is approximate. With this approximation, we can track and trace the motions of multiple incoherent sources in 3D space in real time.

The resultant sound pressure field in the entire frequency range is then given by $$p_{rms}(x, y, z) = \frac{1}{4} \sum_{n} \sum_{i=1}^{4} p_{rms,i}^{(n)} \frac{r_{Sn}}{r_n(x, y, z)}, \quad (18)$$

and the overall sound pressure level is given by $$L_p(x, y, z) = 10\log\left[\frac{p_{rms}^2(x, y, z)}{p_{ref}^2}\right], \quad (19)$$

where $p_{ref}=2\times10^{-5}$ (Pa) is the reference acoustic pressure.

This system 10 is very effective and accurate in identifying the location of an unknown sound source S or multiple incoherent sound sources simultaneously. Also, it works when sources are moving in space. This is possible because the calculations of source locations and visualization of the resultant overall sound pressure field can be done in real time, which is not possible using beamforming or other technologies. The accuracy and spatial resolution of this technology increases with the dimensions of the microphone array and signal to noise ratio. The larger the microphone spacing and signal to noise ratio are, the higher the accuracy and spatial resolution of the 3D soundscaping becomes. Test results have demonstrated that satisfactory results may be obtained using this system when sampling ratio per channel is 109 kHz or higher. FIG. 2 illustrates an example 3D soundscape of sound pressure fields as determined by the system of FIG. 1 (with a different example set of noise sources).

This invention can be used in a variety of fields such as homeland security or a battlefield where locations of snipers need to be identified; hearing loss prevention in a construction site, factory floor or manufacturing environment where background noise level is very high and workers are constantly subject to health hazardous noise exposure; and last but not the least, in identifying noise sources of sound producing products. In many manufacturing industries, engineers are concerned with locating unknown sound sources such as in quality control and troubleshooting buzz, squeak, and rattle noise problems of a car seat, inside a passenger vehicle or aircraft cabin. It enables one to get a quick "look" at sound sources accurately and cost-effectively.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps in the claims are for convenient reference in dependent claims and do not signify a required sequence of performance unless otherwise indicated in the claims.

The invention claimed is:

1. A method for determining a three-dimensional location of at least one noise source including the steps of:
   a) providing a plurality of microphones arranged each at a respective one of a plurality of microphone locations such that the plurality of microphones are not all in a single plane;
   b) measuring sound from at least one noise source in an unknown location with the plurality of microphones each at the respective ones of the plurality of microphone locations; and
   c) determining by the use of a processor a three-dimensional sound pressure field, including at a three-dimensional location of the at least one noise source, based only upon the measurements of sound by the plurality of microphones only taken from the respective ones of the plurality of microphone locations in said step b) and determining time delays in the measurements of the sound between the plurality of said microphones, wherein said step c) includes the step of comparing slopes of the measured sound from the plurality of microphones in a period of time.

2. The method of claim 1 wherein said step c) further includes the step of determining time delays in the measurements of the sound between the plurality of microphones.

3. The method of claim 2 wherein said step c) further includes the step of determining a location of each of the at least one noise source.

4. The method of claim 3 wherein determining the location of each of the at least one noise source includes calculating a square root which yields more than one potential source location and then choosing a correct source location.

5. A method for determining a three-dimensional location of at least one noise source including the steps of:
   a) providing a plurality of microphones arranged each at a respective one of a plurality of microphone locations such that the plurality of microphones are not all in a single plane;
   b) measuring sound from at least one noise source in an unknown location with the plurality of microphones each at the respective ones of the plurality of microphone locations; and
   c) determining by the use of a processor a three-dimensional sound pressure field, including at a three-dimensional location of the at least one noise source, based only upon the measurements of sound by the plurality of microphones only taken from the respective ones of the plurality of microphone locations in said step b), wherein said step c) further includes the step of determining time delays in the measurements of the sound between the plurality of microphones, wherein said step c) further includes the step of determining a location of each of the at least one noise source, wherein determining the location of each of the at least one noise source includes calculating a square root which yields more than one potential source location and then choosing a correct source location, wherein choosing the correct source location includes comparing a calculated time delay to each of the more than one potential source locations to time delays obtained by cross correlations.

6. A method for determining a three-dimensional location of at least one noise source including the steps of:
   a) providing a plurality of microphones arranged each at a respective one of a plurality of microphone locations such that the plurality of microphones are not all in a single plane;
   b) measuring sound from at least one noise source in an unknown location with the plurality of microphones each at the respective ones of the plurality of microphone locations; and
   c) determining by the use of a processor a three-dimensional sound pressure field, including at a three-dimensional location of the at least one noise source, based only upon the measurements of sound by the plurality of microphones only taken from the respective ones of the plurality of microphone locations in said step b), wherein said step c) further includes the step of determining time delays in the measurements of the sound between the plurality of microphones, wherein said step c) further includes the step of determining a location of each of the at least one noise source, wherein determining the location of each of the at least one noise source includes calculating a square root which yields more than one potential source location and then choosing a correct source location, wherein choosing the correct source location includes comparing a rate of decay of measured sound pressure at two microphones with calculated rates of decay based upon the potential source locations.

7. The method of claim 1 wherein said step c) further includes the step of determining a location of each of the at least one noise source.

8. The method of claim 7 wherein the at least one noise source includes more than one noise source, said step c) further including the step of superimposing contributions from the more than one noise source to create the sound pressure field.

9. A system for determining the location of at least one noise source comprising: a plurality of microphones arranged such that the plurality of microphones are not all in a single plane; and a processor for receiving signals from the plurality of microphones based upon noise received from at least one noise source in an unknown location, the processor determining a three-dimensional pressure field for a three-dimensional area including the location of the at least one noise source based upon signals from the plurality of microphones while each of the plurality of microphones is at a single location and determining time delays in the measurements of the noise between the plurality of said microphones, wherein the processor is programmed to compare slopes of the measured noise from the plurality of microphones in a period of time.

10. The system of claim 9 wherein said the processor is programmed to determine time delays in the measurements of the noise between the plurality of microphones.

11. The system of claim 10 wherein the processor is programmed to determine a location of each of the at least one noise source.

12. The system of claim 9 wherein the processor is programmed to determine a location of each of the at least one noise source.

13. The system of claim 9 wherein the at least one noise source includes more than one noise source, and wherein the processor is programmed to superimpose contributions from the more than one noise source to create the sound pressure field.

14. A non-transitory computer readable medium storing instructions, which when executed by a computer perform the steps of:
a) receiving sound signals from only four microphones arranged such that the only four microphones are not all in a single plane, the sound signals representing sound from at least one noise source in an unknown location; and b) determining a three-dimensional sound pressure field, including at the three-dimensional location of the at least one noise source, based upon the sound signals from the only four microphones in said step a) and determining time delays in the measurements of the sound between the plurality of said microphones, wherein said step b) includes the step of comparing slopes of the measured sound from the only four microphones in a period of time.

15. The non-transitory computer readable medium of claim 14 wherein said step b) further includes the step of determining time delays in the measurements of the sound between the microphones.

16. The non-transitory computer readable medium of claim 15 wherein said step b) further includes the step of determining a location of each of the at least one noise source.

17. The non-transitory computer readable medium of claim 16 wherein determining the location of each of the at least one noise source includes calculating a square root which yields more than one potential source location and then choosing a correct source location.

18. The non-transitory computer readable medium of claim 17 wherein choosing the correct source location includes comparing a calculated time delay to each of the more than one potential source locations to time delays obtained by cross correlations.

19. A non-transitory computer readable medium storing instructions, which when executed by a computer perform the steps of:
a) receiving sound signals from only four microphones arranged such that the only four microphones are not all in a single plane, the sound signals representing sound from at least one noise source in an unknown location; and
b) determining time delays in the measurements of the sound between the microphones;
c) calculating a square root which yields more than one potential source location and then choosing a correct source location by comparing a calculated time delay to each of the more than one potential source locations to time delays obtained by cross correlations, wherein choosing the correct source location includes comparing a rate of decay of measured sound pressure at two of the only four microphones with calculated rates of decay based upon the potential source locations; and
c) determining a three-dimensional sound pressure field, including at the three-dimensional location each of the at least one noise source, based upon the sound signals from the only four microphones in said step a).

20. The non-transitory computer readable medium of claim 19 wherein said step b) includes the step of comparing slopes of the measured sound from the only four microphones in a period of time.

21. The non-transitory computer readable medium of claim 14 wherein said step b) further includes the step of determining a three-dimensional location of each of the at least one noise source.

22. The non-transitory computer readable medium of claim 21 wherein the at least one noise source includes more than one noise source, said step b) further including the step of superimposing contributions from the more than one noise source to create the sound pressure field.

23. The non-transitory computer readable medium of claim 14 wherein said step b) further includes the step of determining the three-dimensional location of the at least one noise source based upon the sound signals from the only four microphones in said step a) while each of the only four microphones is fixed at a single location.

24. The method of claim 1 wherein the at least one noise source is in motion during said step b).

25. The method of claim 24 wherein the at least one noise source includes a plurality of noise sources in motion during said step b).

26. The method of claim 1 wherein the plurality of microphones are stationary during all of said step b).

* * * * *

UNITED STATES PATENT AND TRADEMARK OFFICE
CERTIFICATE OF CORRECTION

PATENT NO. : 9,557,400 B2  
APPLICATION NO. : 13/265983  
DATED : January 31, 2017  
INVENTOR(S) : Sean F. Wu Page 1 of 1

It is certified that error appears in the above-identified patent and that said Letters Patent is hereby corrected as shown below:

In the Claims

In Claim 9, Column 11, Line 25; after "delays in" delete "the"

In Claim 13, Column 11, Line 42; before "pressure" replace "the sound" with --a three-dimensional--

In Claim 14, Column 11, Line 52; before "three-dimensional" replace "the" with --a--

In Claim 14, Column 11, Line 55; after "delays in" delete "the"

In Claim 14, Column 11, Line 56; before "microphones" replace "the plurality of said" with --the four--

In Claim 19, Column 12, Line 22; after "delays in" delete "the"

In Claim 19, Column 12, Line 33; before "determining" replace "c)" with --d)--

In Claim 19, Column 12, Line 34; before "three-dimensional" replace "the" with --a--

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*